US008876005B2

(12) United States Patent
Evans et al.

(10) Patent No.: US 8,876,005 B2
(45) Date of Patent: Nov. 4, 2014

(54) ARRANGEMENT FOR AND METHOD OF MANAGING A SOFT KEYBOARD ON A MOBILE TERMINAL CONNECTED WITH A HANDHELD ELECTRO-OPTICAL READER VIA A BLUETOOTH® PAIRED CONNECTION

(71) Applicant: Symbol Technologies, Inc., Schaumburg, IL (US)

(72) Inventors: John P. Evans, Levittown, NY (US); Mariya Wright, Cortlandt Manor, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 26 days.

(21) Appl. No.: 13/629,795

(22) Filed: Sep. 28, 2012

(65) Prior Publication Data

US 2014/0091147 A1    Apr. 3, 2014

(51) Int. Cl.
*G06K 7/10* (2006.01)
*G06K 7/00* (2006.01)

(52) U.S. Cl.
USPC ...... 235/472.02; 235/435; 235/439; 235/454; 235/462.01; 235/462.43; 235/462.45; 235/462.46

(58) Field of Classification Search
CPC .......... G06K 17/0022; G06K 7/10881; H04W 4/008
USPC ........... 235/462.45, 462.46, 472.02; 455/41.3
See application file for complete search history.

(56) References Cited

U.S. PATENT DOCUMENTS

| | | | | |
|---|---|---|---|---|
| 5,496,992 | A | * | 3/1996 | Madan et al. ............ 235/472.02 |
| 6,502,754 | B1 | * | 1/2003 | Bhatia et al. ............ 235/472.01 |
| 7,392,951 | B2 | * | 7/2008 | Ray et al. .................... 235/462.2 |
| 7,866,553 | B2 | | 1/2011 | Liu et al. |
| 2006/0208086 | A1 | * | 9/2006 | Rudeen et al. ........... 235/472.01 |
| 2006/0267730 | A1 | * | 11/2006 | Steinke et al. ............... 340/10.1 |
| 2008/0123568 | A1 | | 5/2008 | Rofougaran |
| 2008/0217411 | A1 | * | 9/2008 | Ledwith et al. .......... 235/472.02 |
| 2008/0314969 | A1 | * | 12/2008 | Hussey ......................... 235/375 |
| 2012/0196539 | A1 | * | 8/2012 | Lee ............................... 455/41.3 |

FOREIGN PATENT DOCUMENTS

WO        2012111018        8/2012

OTHER PUBLICATIONS

"Socket Mobile Apple iOS / Mac OS—HID (Keyboard) Mode", Socket Mobile, Inc. (2011).*

(Continued)

*Primary Examiner* — Steven S Paik
*Assistant Examiner* — Claude J Brown
(74) *Attorney, Agent, or Firm* — Nong-Qiang Fan

(57) ABSTRACT

A wireless Bluetooth® paired connection is established between a Bluetooth® module in an electro-optical, handheld reader and a Bluetooth® module in a mobile terminal via a human interface device (HID) profile. Data capture from a target is initiated upon one type of manual actuation, e.g., a single pull, of a trigger on the reader. A soft keyboard is caused to appear on a display on the terminal, either immediately, or after a predetermined event, after the establishment of the Bluetooth® paired connection. The soft keyboard is caused to disappear upon manual actuation of the trigger with a different type of manual actuation, e.g., a double pull, of the trigger. Another double pull of the trigger will cause the soft keyboard to reappear.

6 Claims, 4 Drawing Sheets

BLUETOOTH PAIRING

(56) References Cited

OTHER PUBLICATIONS

"Serialio.com Scanfob (tm) 2002 Support", retrieved from http://serialio.com/support/Scanner/Scanfob_2002/iPhone_Setup.php on Jun. 5, 2013.*

YouTube video entitled "Show on Screen Keyboard When Scanfob(R) 2002 Barcode Scanner Connecte . . . ", retrieved from http://www.youtube.com/watch?v=0uRIIw5H0wE on Jun. 5, 2013.*

* cited by examiner

ARRANGEMENT FOR AND METHOD OF MANAGING A SOFT KEYBOARD ON A MOBILE TERMINAL CONNECTED WITH A HANDHELD ELECTRO-OPTICAL READER VIA A BLUETOOTH® PAIRED CONNECTION

FIELD OF THE DISCLOSURE

The present disclosure relates generally to an arrangement for, and a method of, managing soft or virtual keyboards on mobile terminals operated under the iOS mobile operating system and wirelessly connected by a Bluetooth® paired connection with electro-optical, handheld readers via a human interface device (HID) profile and, more particularly, to controlling when and how the soft keyboards appear and disappear from displays on such mobile terminals.

BACKGROUND

Moving laser beam readers or laser scanners have long been used as data capture devices to electro-optically read targets, such as one-dimensional bar code symbols, particularly of the Universal Product Code (UPC) type, printed on labels associated with products in many venues, such as supermarkets, warehouse clubs, department stores, and other kinds of retailers. The moving laser beam reader generally includes a housing, a laser for emitting a laser beam, a focusing lens assembly for focusing the laser beam to form a beam spot having a certain size at a focal plane in a range of working distances relative to the housing, a scan component for repetitively scanning the beam spot across a target in a scan pattern, for example, a scan line or a series of scan lines, across the target multiple times per second, a photodetector for detecting light reflected and/or scattered from the target and for converting the detected light into an analog electrical signal, and signal processing circuitry including a digitizer for digitizing the analog signal and a microprocessor for decoding the digitized signal based upon a specific symbology used for the target. The decoded signal identifies the product and is transmitted to a host, e.g., a cash register in a retail venue, for further processing, e.g., product price look-up or product inventorying.

Solid-state imaging systems or imaging readers have also been used as data capture devices in such venues to electro-optically read such targets, as well as two-dimensional bar code symbols, such as PDF417 and QR codes, either printed on product labels or displayed on a display screen of an electronic device, such as a smart phone. The target may also be a form, such as a document, label, receipt, signature, driver's license, employee badge, or payment/loyalty card, etc., each having data fields bearing alphanumeric characters, as well as a picture, to be imaged. The imaging reader includes a housing, a solid-state imager or sensor having an array of cells or photosensors, which correspond to image elements or pixels in a field of view of the imager, an illuminating light assembly for illuminating the field of view with illumination light from an illumination light source, e.g., one or more light emitting diodes (LEDs), and an imaging lens assembly for capturing return ambient and/or illumination light scattered and/or reflected from the target being imaged over a range of working distances. Such an imager may include a one- or two-dimensional charge coupled device (CCD) or a complementary metal oxide semiconductor (CMOS) device analogous to those conventionally used in consumer digital cameras, and associated circuits for producing electronic signals corresponding to a one- or two-dimensional array of pixel information over the field of view. Signal processing circuitry including a microprocessor processes the electronic signals to decode the target if the target is a symbol. If the target is a form, then the microprocessor processes the electronic signals to identify the form and the data fields thereon. An aiming light generator may also be provided in the housing for projecting an aiming light pattern or mark on the target prior to imaging. If the target is a symbol, then the decoded signal identifies the product and is transmitted to a host, e.g., a cash register in a retail venue, for further processing, e.g., product price look-up or product inventorying.

Both types of readers can be operated in a portable, wireless, handheld mode, in which an operator, e.g., a clerk or a customer, holds the respective wireless housing in his or her hand, and aims the respective wireless housing at the target, and then initiates the data capture and the reading of the target by manual actuation of a trigger on the respective housing. Electrical power to the electronic components in the wireless housing can be supplied via a rechargeable battery in the housing. A radio frequency (RF) transceiver, e.g., a Bluetooth® module, in the wireless housing communicates data, including data indicative of the target being read, as well as control data and update data, over a bi-directional wireless channel with a corresponding Bluetooth® module located in the host or a docking station where battery recharging can be performed. As is well known, Bluetooth® is a proprietary open wireless technology standard for exchanging data over short distances (using short-wavelength radio transmissions in the industrial, scientific and medical (ISM) radio band from 2400-2480 MHZ) from fixed and mobile devices, creating personal area networks with high levels of security.

As advantageous as such readers are, their functionality and their usage can be enhanced by connecting and pairing them to a Bluetooth®-capable mobile terminal, such as an iPhone® device, an iPad® device, or an iPod® touch device (operated under the iOS mobile operating system available from Apple, Inc. of Cupertino, Calif.), via a human interface device (HID) profile. The Bluetooth® HID profile defines the protocols, procedures, and features to be used by Bluetooth®-capable peripheral devices, such as keyboards, pointing devices, gaming devices, remote monitoring devices and data capture devices, such as the electro-optical readers described above. The iPhone® device, the iPad® device, and the iPod® touch device support a Bluetooth® HID profile paired connection.

However, as advantageous as the use of such Bluetooth®-capable readers in combination with such Bluetooth®-capable mobile terminals has been, one concern relates to the suppression and disabling of the soft or virtual keyboard on the iPhone® device, the iPad® device, and the iPod® touch device, upon the establishment of the Bluetooth® HID profile paired connection between the readers and the mobile terminals. The Bluetooth® HID profile paired connection treats and "sees" the connected reader as a keyboard, and thus, the iPhone® device, the iPad® device, and the iPod® touch device, do not present or display their own soft or virtual keyboards. This poses a problem for operators who want to enter text, but are prevented from doing so during a reading session.

In order to implement the soft keyboard function of the mobile terminal, it is known to completely shut down the Bluetooth® HID profile paired connection and/or to completely disconnect the reader from the mobile terminal, thereby enabling the soft keyboard to appear on the mobile terminal for text entry. This solution, however, is not only inconvenient and time-consuming, but may also result in a loss of the data. It is also known to provide one or more, extra, dedicated, function keys or physical buttons on the reader to supply or remove power to the Bluetooth® module in the reader to enable the soft keyboard to appear on the mobile terminal. This solution, however, is not cost-effective, because it requires the manufacturer to provide and program extra keys on the readers. It is further known to provide a virtual key that supplies or removes power to the Bluetooth® module in the reader by scanning a special bar code symbol. However, the special bar code symbol may not always be available and, in any event, this is another time-consuming, laborious procedure.

Accordingly, there is a need to control when and how a soft keyboard on such a Bluetooth®-capable mobile terminal appears and disappears when connected to a Bluetooth®-capable reader via a Bluetooth® HID profile paired connection, without having to completely shut down the Bluetooth® HID profile paired connection and/or to completely disconnect the reader from the mobile terminal, and without requiring extra dedicated physical or virtual keys to be provided on the reader.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
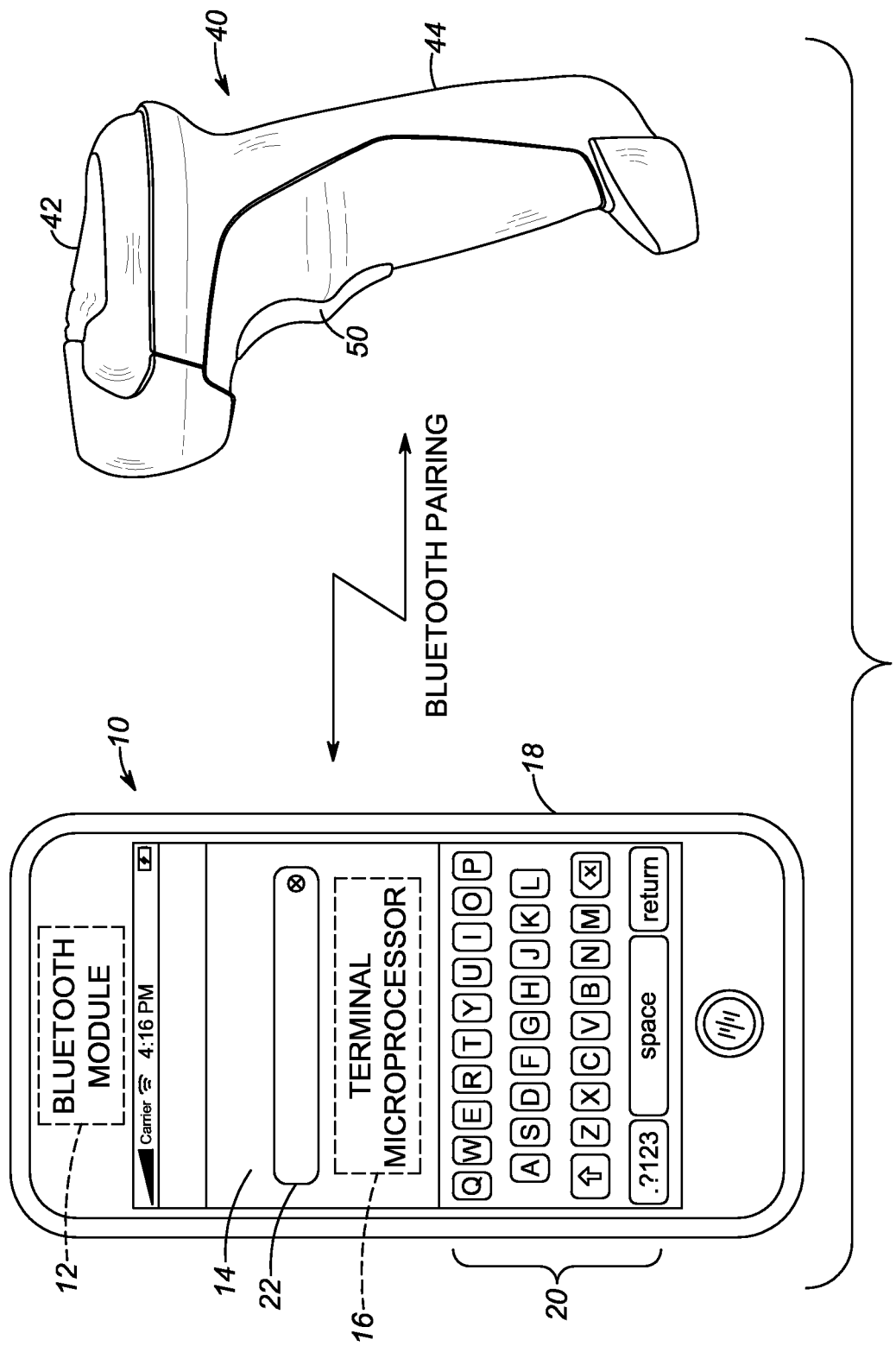
FIG. 1 is a schematic view of a Bluetooth®-capable reader connected via a Bluetooth® HID profile paired connection to a Bluetooth®-capable mobile terminal in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a soft keyboard management arrangement that comprises an electro-optical, handheld reader and a mobile terminal. The reader includes a data capture assembly for capturing data from a target, a manually actuatable trigger on the reader for initiating the data capture upon one type of manual actuation, a reader microprocessor for processing the data, and a Bluetooth® module in the reader. The mobile terminal includes a Bluetooth® module for establishing a wireless Bluetooth® paired connection with the Bluetooth® module in the reader via a human interface device (HID) profile. The mobile terminal also includes a display on the terminal, and a terminal microprocessor for enabling a soft keyboard to appear on the display, and for causing the soft keyboard to disappear upon manual actuation of the trigger with a different type of manual actuation.

In one embodiment, the data capture assembly includes a solid-state imager for capturing an image of the target in response to manual actuation of the trigger with the one type of manual actuation, and the reader microprocessor processes the image of the target. In another embodiment, the data capture assembly includes a scan component for moving a laser beam across the target for reflection therefrom in response to manual actuation of the trigger with the one type of manual actuation, and a detector for detecting return light from the target, and the reader microprocessor processes the return light from the target.

Advantageously, the mobile terminal is an iPhone® device, an iPad® device, or an iPod® touch device that supports the HID profile. Preferably, the one type of manual actuation is a single pull on the trigger, and the different type of manual actuation is a double pull on the trigger. Other different types of manual actuation are contemplated.

In one embodiment, the terminal microprocessor detects the establishment of the Bluetooth® paired connection, and automatically enables the soft keyboard to appear on the display immediately upon the detection of the Bluetooth® paired connection. In another embodiment, the terminal microprocessor detects the establishment of the Bluetooth® paired connection, and detects when a predetermined event has occurred after the establishment of the Bluetooth® paired connection, and enables the soft keyboard to appear on the display immediately upon the detection of the predetermined event after the establishment of the Bluetooth® paired connection. In still another embodiment, the terminal microprocessor detects the different type of manual actuation of the trigger, and enables the soft keyboard to appear on the display immediately upon the detection of the different type of manual actuation of the trigger. Thus, the double pull on the trigger is a toggle switch, wherein, upon a first occurrence of the double pull, the terminal microprocessor causes the soft keyboard to disappear, and, upon a second occurrence of the double pull, the terminal microprocessor causes the soft keyboard to appear, or vice versa.

A method, in accordance with another aspect of this disclosure, is performed by establishing a wireless Bluetooth® paired connection between a Bluetooth® module in an electro-optical, handheld reader and a Bluetooth® module in a mobile terminal via a human interface device (HID) profile, by initiating data capture from a target upon one type of manual actuation of a trigger on the reader, by enabling a soft keyboard to appear on a display on the terminal, and by causing the soft keyboard to disappear upon manual actuation of the trigger with a different type of manual actuation.

Turning now to the drawings, FIG. 1 depicts a Bluetooth®-capable electro-optical, handheld reader 40 wirelessly connected to, and paired with, a Bluetooth®-capable mobile terminal 10 via a Bluetooth® human interface device (HID) profile. As explained below in connection with FIGS. 2-3, the reader 40 includes a portable, handheld housing 42 having a handle 44 on which a manually actuatable trigger 50 for initiating reading is mounted. As explained below, the mobile terminal 10 can be an iPhone® device, an iPad® device, or an iPod® touch device (each operated under the iOS mobile operating system available from Apple, Inc. of Cupertino, Calif.), each of which supports the Bluetooth® HID profile.

Figure 2:
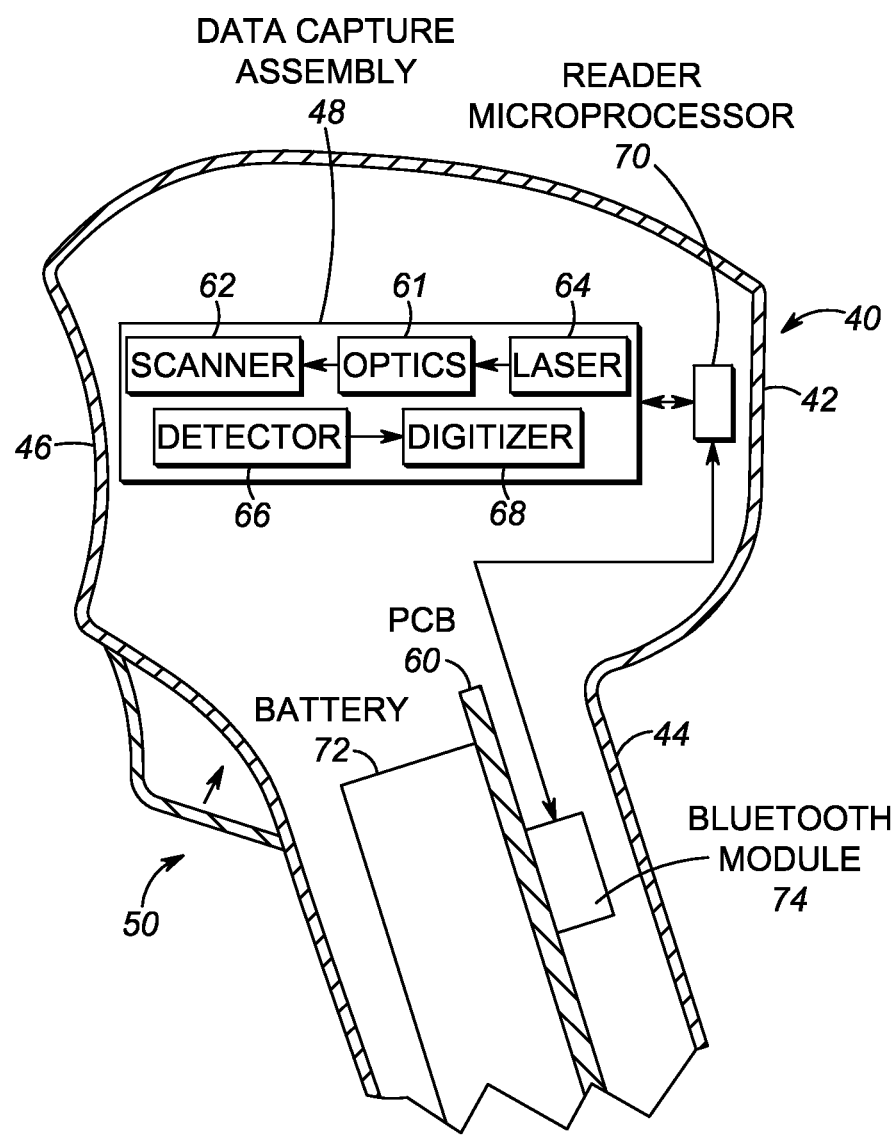
FIG. 2 is a broken-away schematic view of a laser-based embodiment of the Bluetooth®-capable reader of FIG. 1.

In one embodiment of the reader 40, a moving laser beam reader, as shown in FIG. 2, is operative for electro-optically reading a target such as a coded symbol, that may use, and benefit from, the present disclosure. The beam reader 40 of FIG. 2 includes a scanner 62 mounted in the housing 42 having the handle 44 on which the trigger 50 for initiating reading is mounted, and operative for scanning an outgoing laser beam from a laser 64 and/or a field of view of a light detector or photodiode 66 in a scan pattern, typically comprised of one or more scan lines, multiple times per second, for example, one-hundred times per second, through a housing window 46 across the symbol for reflection or scattering therefrom as return light detected by the photodiode 66 during reading. The beam reader 40 also includes a focusing lens assembly or optics 61 for optically modifying the outgoing laser beam to have a large depth of field, and a digitizer 68 for converting an electrical analog signal generated by the detector 66 from the return light into a digital signal for subsequent decoding by a microprocessor or controller 70 into data indicative of the symbol being read. The aforementioned components, except for the controller 70, is depicted in FIG. 1 as a data capture assembly 48.

Figure 3:
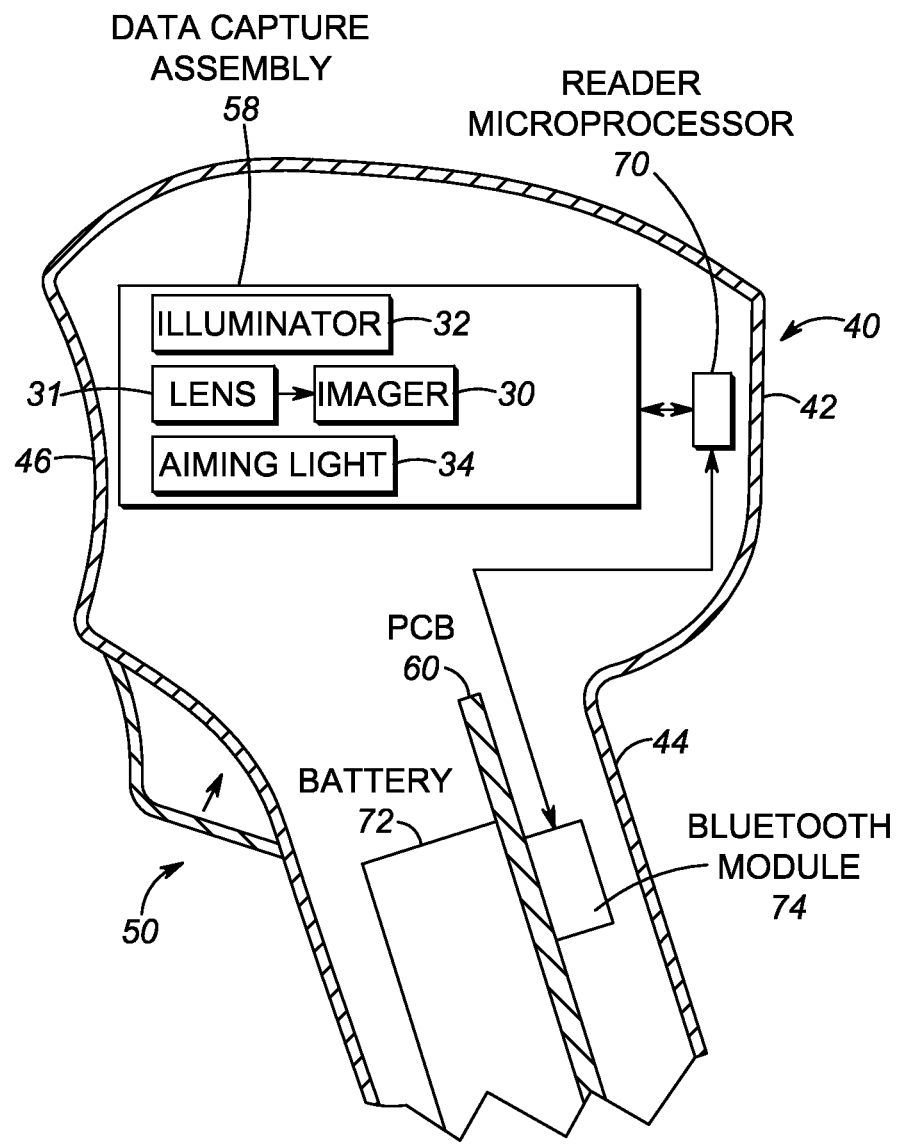
FIG. 3 is a broken-away schematic view of an imager-based embodiment of the Bluetooth®-capable reader of FIG. 1.

In another embodiment of the reader 40, FIG. 3 depicts an imaging reader for imaging targets, such as forms or coded symbols to be electro-optically read, which may also use, and benefit from, the present disclosure. The imaging reader of FIG. 3 includes a one- or two-dimensional, solid-state imager 30, preferably a CCD or a CMOS array, mounted in the portable handheld housing 42 having the handle 44 on which the trigger 50 for initiating reading is mounted. The imager 30 has an array of image sensors operative, together with an imaging lens assembly 31, for capturing return light reflected and/or scattered from the target through the housing window 46 during the imaging to produce an electrical signal indicative of a captured image for subsequent decoding by the controller 70 into data indicative of the target being read.

The imaging reader of FIG. 3 includes an illuminator 32 for illuminating the target during the imaging with illumination light directed from an illumination light source through the window 46. Thus, the return light may be derived from the illumination light and/or ambient light. The illumination light source comprises one or more light emitting diodes (LEDs). An aiming light source 34 may also be provided for emitting an aiming beam and for projecting an aiming light pattern or mark on the target prior to imaging. The aforementioned components, except for the controller 70, is depicted in FIG. 3 as a data capture assembly 58.

In operation of the imaging reader of FIG. 3, the controller 70 sends a command signal to drive the illuminator LEDs 32, typically continuously, or sometimes periodically, during scanning, and energizes the imager 30 during an exposure time period of a frame to collect light from the target during a short time period, say 500 microseconds or less. A typical array needs about 11-33 milliseconds to read the entire target image and operates at a frame rate of about 30-90 frames per second. The array may have on the order of one million addressable image sensors.

Also shown in FIGS. 2-3 is a printed circuit board (PCB) 60 in the handle 44 on which a rechargeable battery 72 and a Bluetooth® module 74 are mounted. The rechargeable battery 72 supplies electrical power to all the electrical components in the readers 40 of FIGS. 2-3 in the handheld mode. The Bluetooth® module 74 provides bi-directional communication with other electronic devices, such as a host computer (not illustrated), and/or the aforementioned mobile terminal 10, having a corresponding Bluetooth® module, as described below, via a Bluetooth® wireless link and can be implemented as, for example, a radio frequency (RF) transceiver. This Bluetooth® module 74 receives decoded data to be transmitted from the controller 70. As noted above, Bluetooth® is an open wireless standard for short-range transmission of digital voice and data between devices and supports point-to-point and multipoint applications.

Returning to FIG. 1, the mobile terminal 10 includes a handheld case 18, a Bluetooth® module 12 in the case 18 for establishing a wireless Bluetooth® paired connection with the Bluetooth® module 74 in the reader 40 via the HID profile. The mobile terminal 10 also includes a screen or display 14 on the case 18, and a terminal microprocessor 16 in the case 18 for managing when and how a soft or virtual keyboard 20 either appears on the display 14, or disappears from the display 14, as described below. The soft keyboard 20 (sometimes called an onscreen keyboard or a software keyboard) replaces a hardware keyboard with an on-screen image map. The soft keyboard 20 is typically used to enable touch input on a handheld device so that a hardware keyboard does not have to be carried with it. The soft keyboard 20 can usually be moved and resized, and generally can allow any input that the hardware version does.

As described above, upon the establishment of the Bluetooth® HID profile paired connection between the reader 40 and the mobile terminal 10, the Bluetooth® HID profile paired connection treats and "sees" the connected reader 40 as a hardware keyboard, and thus, the mobile terminal 10 does not present or display its own soft keyboard 20. Operators who want to enter text, for example in data field 22 on the display 14, are thus prevented from doing so during a reading session.

In accordance with one aspect of this disclosure, the terminal microprocessor 16 is operative for enabling the soft keyboard 20 to appear on the display 14 in various ways. In one embodiment, the terminal microprocessor 16 detects the establishment of the Bluetooth® paired connection, and automatically enables the soft keyboard 20 to appear on the display 14 immediately upon the detection of the Bluetooth® paired connection. In another embodiment, the terminal microprocessor 16 detects the establishment of the Bluetooth® paired connection, and detects when a predetermined event has occurred, e.g., the successful reading of a target after the establishment of the Bluetooth® paired connection, in which case, the terminal microprocessor 16 enables the soft keyboard 20 to appear on the display 14 immediately upon the detection of the predetermined event after the establishment of the Bluetooth® paired connection. For example, the reader microprocessor 70 can detect the Bluetooth® paired connection and can also detect when a successful reading has occurred. Upon each such detection, the reader microprocessor 70 can generate and send a keyboard command signal to the terminal microprocessor 16, which then acts to cause the soft keyboard 20 to appear on the display 14.

In accordance with another aspect of this disclosure, the terminal microprocessor 16 is operative for enabling the soft keyboard 20 to appear on the display 14, or for causing the soft keyboard 20 to disappear from the display 14, by detection of the operation of the aforementioned trigger 50. The trigger 50 initiates data capture and reading by having the operator perform a certain type of manual actuation, typically a single pull on the trigger 50. By specifying that the terminal microprocessor 16 detect a different type of manual actuation of the trigger 50, e.g., a double pull on the trigger 50, the terminal microprocessor 16 can be made operative to enable the soft keyboard 20 to appear on the display 14 immediately upon the detection of the double pull on the trigger 50, or can be made operative to enable the soft keyboard 20 to disappear from the display 14 immediately upon the detection of the double pull on the trigger 50. Thus, the double pull on the trigger 50 serves as a toggle switch, wherein, upon a first occurrence of the double pull, the terminal microprocessor 16 causes the soft keyboard 20 to disappear, and, upon a second occurrence of the double pull, the terminal microprocessor 16 causes the soft keyboard 20 to appear, or vice versa.

Thus, this disclosure no longer requires the complete shut down the Bluetooth® HID profile paired connection and/or the complete disconnection the reader 40 from the mobile terminal 10 in order to enter text on the soft keyboard 20. Nor are any extra dedicated physical or virtual keys required to be provided on the reader 40. The trigger 50 is not an extra key, but a different operation thereof is employed to perform an operation other than data capture.

Figure 4:
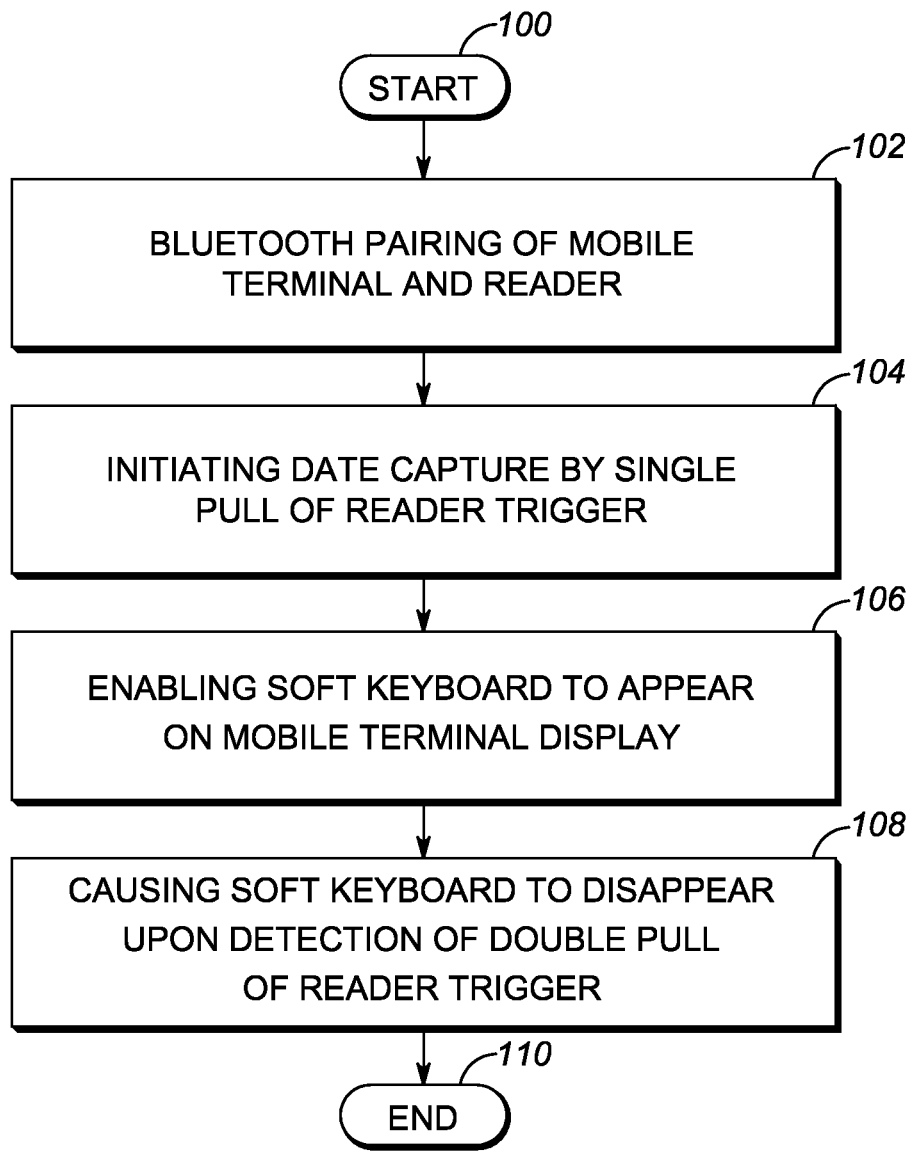
FIG. 4 is a flow chart depicting steps performed in accordance with the method of the present disclosure.

Turning now to the flow chart of FIG. 4, a soft keyboard management method is performed starting in step 100, by first establishing a wireless Bluetooth® paired connection between the Bluetooth® module 74 in the electro-optical, handheld reader 40 and the Bluetooth® module 12 in the mobile terminal 10 via a human interface device (HID) profile in step 102, by then initiating data capture from a target in a reading session upon one type of manual actuation of the trigger 50 (e.g., a single pull) in step 104, by enabling the soft keyboard 20 to appear on the display 14 on the terminal 10 in step 106, and by causing the soft keyboard 20 to disappear upon manual actuation of the trigger 50 with a different type of manual actuation of the trigger 50 (e.g., a double pull) in step 108, prior to ending the reading session in step 110.

In the foregoing specification, specific embodiments have been described. However, one of ordinary skill in the art appreciates that various modifications and changes can be made without departing from the scope of the invention as set forth in the claims below. For example, trigger actuations, other than a double pull, can be employed to toggle the soft keyboard 20. Thus, pulling and holding the trigger 50 for an extended time period can be used to toggle the soft keyboard 20. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A soft keyboard management arrangement, comprising:
   an electro-optical, handheld reader including a data capture assembly in the reader for capturing data from a target, a manually actuatable trigger on the reader for initiating the data capture upon one type of manual actuation, a reader microprocessor in the reader for processing the data, and a Bluetooth-standard-compliant module in the reader; and a mobile terminal including a Bluetooth-standard-compliant module for establishing a wireless Bluetooth-standard-compliant paired connection with the Bluetooth-standard-compliant module in the reader via a human interface device (HID) profile, a display on the terminal, and a terminal microprocessor for enabling a soft keyboard to appear on the display, and for causing the soft keyboard to disappear upon manual actuation of the trigger with a different type of manual actuation;

wherein the terminal microprocessor is operative for detecting the establishment of the Bluetooth-standard-compliant paired connection, and for automatically enabling the soft keyboard to appear on the display immediately upon the detection of the Bluetooth-standard-compliant paired connection; and wherein the one type of manual actuation is a single pull on the trigger, and wherein the different type of manual actuation is a double pull on the trigger, and wherein the terminal microprocessor is operative for detecting a first occurrence of the double pull to cause the soft keyboard to disappear.

2. The arrangement of claim 1, wherein the data capture assembly includes a solid-state imager for capturing an image of the target in response to manual actuation of the trigger with the one type of manual actuation, and wherein the reader microprocessor is operative for processing the image of the target.

3. The arrangement of claim 1, wherein the data capture assembly includes a scan component for moving a laser beam across the target for reflection therefrom in response to manual actuation of the trigger with the one type of manual actuation, and a detector for detecting return light from the target, and wherein the reader microprocessor is operative for processing the return light from the target.

4. A soft keyboard management method, comprising:

establishing a wireless Bluetooth-standard-compliant paired connection between a Bluetooth-standard-compliant module in an electro-optical, handheld reader and a Bluetooth-standard-compliant module in a mobile terminal via a human interface device (HID) profile;

initiating data capture from a target upon one type of manual actuation of a trigger on the reader;

enabling a soft keyboard to appear on a display on the terminal; and causing the soft keyboard to disappear upon manual actuation of the trigger with a different type of manual actuation;

detecting the establishment of the Bluetooth-standard-compliant paired connection, and automatically enabling the soft keyboard to appear on the display immediately upon the detection of the Bluetooth-standard-compliant paired connection; and detecting the different type of manual actuation of the trigger, and enabling the soft keyboard to appear on the display immediately upon the detection of the different type of manual actuation of the trigger.

5. The method of claim 4, wherein the data capture is performed by a solid-state imager for capturing an image of the target in response to manual actuation of the trigger with the one type of manual actuation, and by processing the image of the target.

6. The method of claim 4, wherein the data capture is performed by moving a laser beam across the target for reflection therefrom in response to manual actuation of the trigger with the one type of manual actuation, by detecting return light from the target, and by processing the return light from the target.

* * * * *